US012689279B2

(12) United States Patent (10) Patent No.: US 12,689,279 B2
Patel et al. (45) Date of Patent: Jul. 21, 2026

(54) WINDMILL BRAKE FOR AN AUXILIARY POWER UNIT

(71) Applicant: Hamilton Sundstrand Corporation, Charlotte, NC (US)

(72) Inventors: Dhaval S. Patel, Schaumburg, IL (US); Kyle Ives, Loves Park, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 387 days.

(21) Appl. No.: 18/507,834

(22) Filed: Nov. 13, 2023

(65) Prior Publication Data

US 2025/0158502 A1 May 15, 2025

(51) Int. Cl.
| | |
|---|---|
| *H02K 49/06* | (2006.01) |
| *H02K 7/00* | (2006.01) |
| *H02K 7/106* | (2006.01) |
| *H02K 7/18* | (2006.01) |
| *H02K 11/00* | (2016.01) |
| *H02K 11/20* | (2016.01) |
| *B64D 41/00* | (2006.01) |

(52) U.S. Cl.
CPC ............ *H02K 49/06* (2013.01); *H02K 7/006* (2013.01); *H02K 7/106* (2013.01); *H02K 7/1807* (2013.01); *H02K 7/1823* (2013.01); *H02K 11/0094* (2013.01); *H02K 11/20* (2016.01); *B64D 41/00* (2013.01)

(58) Field of Classification Search
CPC ........ H02K 49/06; H02K 7/006; H02K 7/106; H02K 7/1807; H02K 7/1823; H02K 11/0094; H02K 11/20; F05D 2220/50; F05D 2220/7642; F05D 2220/766; F05D 2220/768; F05D 21/006; B64D 41/00
See application file for complete search history.

(56) References Cited

U.S. PATENT DOCUMENTS

| | | | | |
|---|---|---|---|---|
| 3,947,739 A | * | 3/1976 | Horiuchi | H02P 3/14 |
| | | | | 318/376 |
| 4,039,914 A | * | 8/1977 | Steigerwald | H02P 3/22 |
| | | | | 318/762 |
| 4,949,021 A | * | 8/1990 | Rozman | H02P 9/08 |
| | | | | 318/400.14 |

(Continued)

FOREIGN PATENT DOCUMENTS

| | | |
|---|---|---|
| JP | 2008005612 A | 1/2008 |
| WO | 2022196687 A1 | 9/2022 |

OTHER PUBLICATIONS

European Search Report for Application No. 24212643.1, mailed Feb. 28, 2025, 9 pages.

*Primary Examiner* — Robert A. Siconolfi
*Assistant Examiner* — James K Hsiao
(74) *Attorney, Agent, or Firm* — CANTOR COLBURN LLP

(57) ABSTRACT

A power generation system for an aircraft. The system includes an auxiliary power unit (APU), an APU generator mechanically linked to the APU, a generator control unit controllably coupled to the APU and an electromagnetic windmilling brake connected to APU generator. The electromagnetic windmilling brake includes a number of switched phase connections equal to a number of phases and the switched phase connections are configured to connect each output phase to an adjacent phase.

20 Claims, 2 Drawing Sheets

(56) References Cited

U.S. PATENT DOCUMENTS

| | | | | |
|---|---|---|---|---|
| 5,029,263 | A * | 7/1991 | Rozman | F02N 11/04 |
| | | | | 318/438 |
| 5,140,245 | A * | 8/1992 | Stacey | G08C 19/42 |
| | | | | 318/723 |
| 5,430,362 | A * | 7/1995 | Carr | H02P 9/302 |
| | | | | 318/779 |
| 5,845,483 | A * | 12/1998 | Petrowicz | F02C 7/262 |
| | | | | 60/788 |
| 6,467,725 | B1 * | 10/2002 | Coles | F01D 15/10 |
| | | | | 244/58 |
| 7,117,683 | B2 * | 10/2006 | Thompson | F01D 19/00 |
| | | | | 60/786 |
| 7,456,510 | B2 * | 11/2008 | Ito | F03D 7/026 |
| | | | | 290/44 |
| 7,621,117 | B2 * | 11/2009 | Dooley | F01D 19/00 |
| | | | | 60/793 |
| 7,728,477 | B2 | 6/2010 | Birdi et al. | |
| 10,717,539 | B2 * | 7/2020 | Menheere | F02C 3/145 |
| 11,121,653 | B2 * | 9/2021 | Onoe | H02P 9/305 |
| 11,374,520 | B2 * | 6/2022 | Yajurvedi | H02P 6/181 |
| 11,565,824 | B2 * | 1/2023 | Huang | H02P 9/307 |
| 11,745,863 | B2 | 9/2023 | Mohammed et al. | |
| 2006/0260323 | A1 * | 11/2006 | Moulebhar | F01D 21/003 |
| | | | | 60/793 |
| 2007/0289310 | A1 | 12/2007 | Dooley et al. | |
| 2008/0136257 | A1 * | 6/2008 | Flanigan | H02P 9/307 |
| | | | | 307/10.1 |
| 2012/0180498 | A1 * | 7/2012 | Francisco | F02C 7/268 |
| | | | | 60/788 |
| 2013/0265806 | A1 * | 10/2013 | Wang | H02J 3/0014 |
| | | | | 363/37 |
| 2017/0260872 | A1 * | 9/2017 | Munevar | B64D 31/18 |
| 2017/0320584 | A1 * | 11/2017 | Menheere | F02C 3/10 |
| 2024/0388230 | A1 * | 11/2024 | Mohammed | F01D 21/006 |
| 2024/0413711 | A1 * | 12/2024 | Joshi | H02K 9/197 |
| 2025/0290430 | A1 * | 9/2025 | Rambo | F02C 7/36 |

* cited by examiner

WINDMILL BRAKE FOR AN AUXILIARY POWER UNIT

BACKGROUND

Exemplary embodiments of the present disclosure pertain to the art of auxiliary power unit (APU) control, and specifically to APU braking to avoid APU windmilling.

In addition to the turbines that provide thrust, aircraft can also include what is referred to as an auxiliary power unit (APU). An APU is a small gas turbine engine typically installed near the rear of the aircraft. Aircraft rely on APUs to provide three main functions, i.e., starting the aircraft main engines, providing compressed air to the environmental control systems (ECS), and providing electrical power to the aircraft accessory systems when the main generators are not running.

Due to the function of the APU, the APU is not always intended to be operational. Certain conditions, such as exhaust air backflow and crosswinds can cause the APU to rotate when the APU is not being used. This rotation is referred to as reverse windmilling and such rotation of the APU when it is not intended to be functioning (e.g., when reverse windmilling occurs) can negatively impact performance.

BRIEF DESCRIPTION

Disclosed is a power generation system for an aircraft. The system includes an auxiliary power unit (APU), an APU generator mechanically linked to the APU, a generator control unit controllably coupled to the APU and an electromagnetic windmilling brake connected to APU generator. The electromagnetic windmilling brake includes a number of switched phase connections equal to a number of phases and the switched phase connections are configured to connect each output phase to an adjacent phase of the APU generator when the electromagnetic windmilling brake is engaged.

In addition to one or more of the features described above, or as an alternative to any of the foregoing embodiments, each switched phase connection can comprise a controlled switch.

In addition to one or more of the features described above, or as an alternative to any of the foregoing embodiments, each switched phase connection can further comprise a resistor in series with the controlled switch.

In addition to one or more of the features described above, or as an alternative to any of the foregoing embodiments, a braking torque of the electromagnetic windmilling brake is dependent on the resistance of each resistor.

In addition to one or more of the features described above, or as an alternative to any of the foregoing embodiments, the controller can include memory storing instructions for causing the controller to respond to the APU transitioning from an on state to an off state by engaging the electromagnetic windmilling brake.

In addition to one or more of the features described above, or as an alternative to any of the foregoing embodiments, the electromagnetic windmilling brake can be is self-powered.

In addition to one or more of the features described above, or as an alternative to any of the foregoing embodiments, each switch in the electromagnetic windmilling brake is a normally closed switch and wherein power generated by rotation of the APU opens the normally closed switch.

In addition to one or more of the features described above, or as an alternative to any of the foregoing embodiments, the electromagnetic windmilling brake can be a component of the APU generator.

In addition to one or more of the features described above, or as an alternative to any of the foregoing embodiments, the electromagnetic windmilling brake can be disposed remote from the APU generator.

In addition to one or more of the features described above, or as an alternative to any of the foregoing embodiments, the electromagnetic windmilling brake can be disposed electrically between an output of the APU generator and a rectifier.

Also disclosed is method of preventing windmilling in an auxiliary power unit (APU) that is operatively connected to an APU generator. The method can be applied to any system or generator disclosed herein. The method includes: responding to transitioning the APU from on to off by connecting each output phase of APU generator to an adjacent phase of the APU generator using a switched connection.

In addition to one or more of the features described above, or as an alternative to any of the foregoing embodiments, connecting the output phases of the APU generator can include actively closing a plurality of switches thereby creating an electrical pathway between output phases.

In addition to one or more of the features described above, or as an alternative to any of the foregoing embodiments, each electrical pathway can include a resistor in series with a corresponding switch in the plurality of switches.

In addition to one or more of the features described above, or as an alternative to any of the foregoing embodiments, connecting each output phase of the PMG to each other output phase of the PMG can include removing power from a plurality of normally closed switches thereby creating an electrical pathway from each output phase to each other output phase.

In addition to one or more of the features described above, or as an alternative to any of the foregoing embodiments, the APU generator can include a permanent magnet generator (PMG) that includes a PMG rotor.

In addition to one or more of the features described above, or as an alternative to any of the foregoing embodiments, the APU generator can be arranged such that it does not include a rotor position sensor.

In addition to one or more of the features described above, or as an alternative to any of the foregoing embodiments, the generator control unit can be configured to apply a braking torque with the electromagnetic windmilling brake until the rotor spins faster than a threshold.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
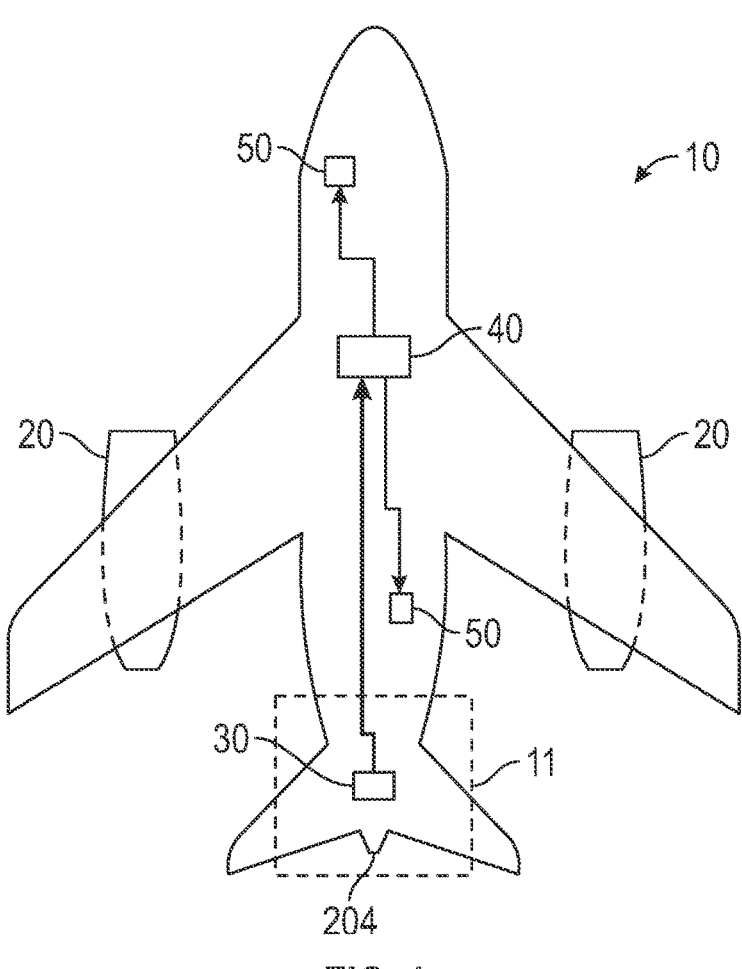
FIG. 1 is a schematic representation of an aircraft according to one example.

FIG. 1 schematically illustrates an exemplary aircraft 10 including wing mounted gas turbine engines 20. The aircraft 10 also includes an auxiliary power unit (APU) 30 mounted in the tail portion 30 of the aircraft 10.

The APU 30, as noted above, is a small turbine engine that burns fuel to generate rotational energy. The APU 30 can include a permanent magnet generator that is driven by this rotational energy such that it generated electrical power. Electrical power from the APU 30 is provided to a power distribution system 40. The power distribution system 40 delivers power to electric loads 50 throughout the aircraft 10 and distributes the power to components and systems on the aircraft 10, as needed. For example, when the aircraft 10 is on the ground, the APU 30 can provide electrical power for the aircraft when engines 20 are off. The APU 30 can also be used to provide electrical power to aid in starting the engines 20. The APU 30 can also be used for emergency power if a main channel (e.g., turbine or power generator connected to the turbine) goes down. In such a case inflight APU 30 restarts are required. Windmilling during flight can cause the inflight restart to stall or require more input power.

In addition, bleed/compressed air from the APU 30 can be provided to one or more air cycle machines 202 (FIG. 2) when the engines 20 are off.

Figure 2:
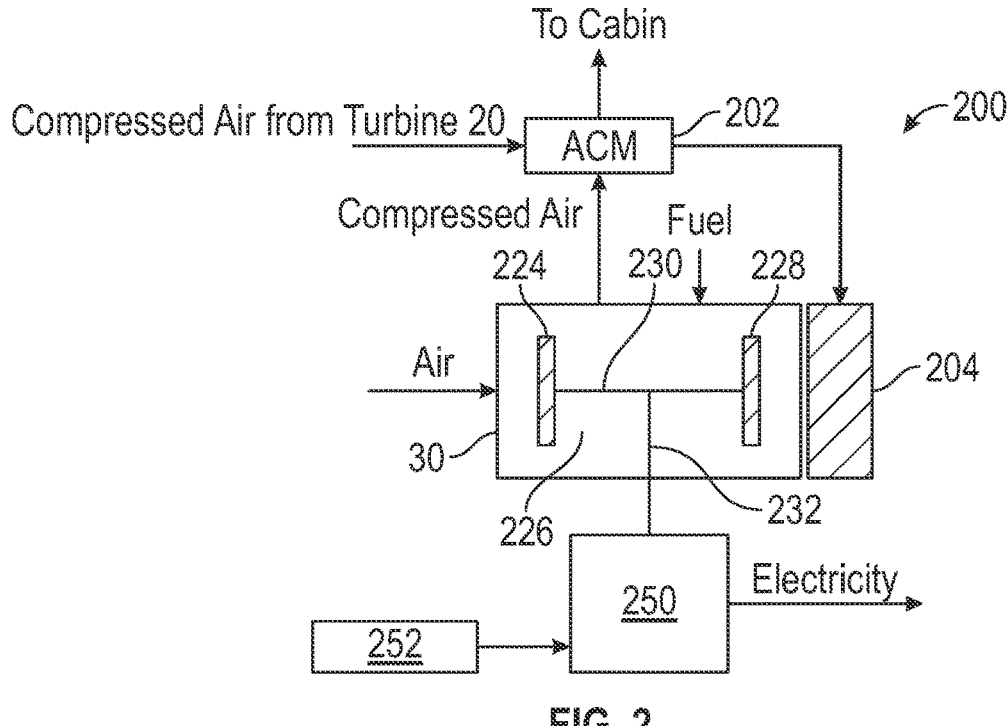
FIG. 2 shows a simplified version system that includes an APU connected to an air cycle machine (ACM) and to an APU generator such that the APU generator can control windmilling of the APU.

FIG. 2 shows a system 200 that includes an APU 30 connected to an air cycle machine 202. During normal flight, the ACM 202 receives compressed air from the turbines 20 and conditions or otherwise prepares the air for introduction into the aircraft cabin. The ACM 202 exhausts air into aircraft exhaust 204. The exhaust 204 can be, for example, located at the tail section 11 of the aircraft 10 (FIG. 1).

Figure 3:
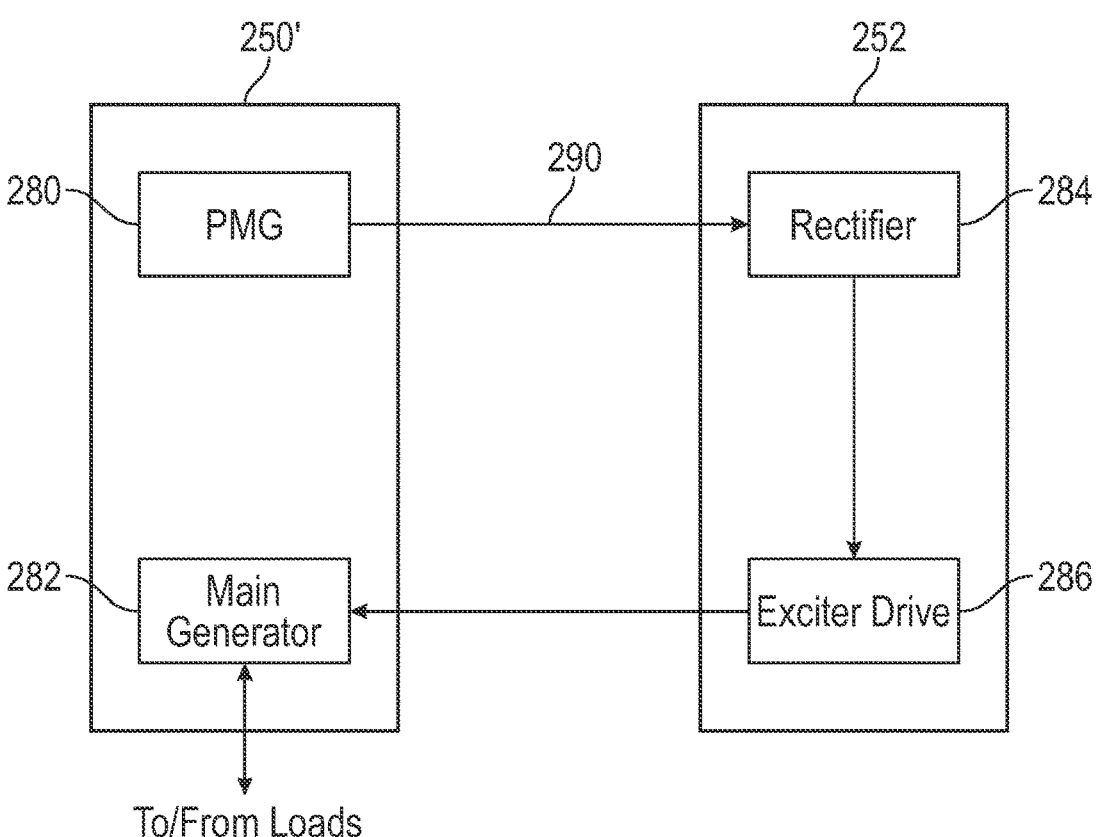
FIG. 3 shows a more complete view of APU generator that includes both a permanent magnet generator (PMG) and main generator both controlled by a generator control unit.

The APU 30 also exhausts air into the exhaust 204. The air from the ACM 202 or other air that enters the exhaust can flow backwards into the APU 30 and cause the APU 30 to windmill. Embodiments herein utilize an APU generator 250 connected to the APU 30 to reduce, eliminate or otherwise control the windmilling. As noted below, the braking can be achieved by providing a breaking circuit (or brake) that shorts the output of the lines of a PMG that forms part of the APU generator. As noted below, in one embodiment, the APU generator 250 is formed by a PMG. In another embodiment, the APU generator can include a PMG and a main generator as shown in FIG. 3.

With further reference to FIG. 2, the APU 30 receives fuel and generates rotational energy from it when operated. In more detail, the APU 30 is a turbine engine that includes a compressor 224, a combustor section 226 and a turbine 228. A shaft 230 connects the compressor 224 and the turbine 228.

The compressor section 224 receives air from an external source (e.g., an APU air duct), compresses it, and provides the air to the combustor section 226. The compressed air is mixed with fuel and burned in the combustion section 226. The air is then then expanded in the turbine 228. In this manner, the turbine 228 can provide rotational energy to the shaft 230 to drive the compressor 224.

In addition, the shaft 230 can be arranged so that it can provide rotational energy to an accessory drive shaft 232 to provide rotational energy to an APU generator 250. In one embodiment, the APU generator 250 is connected directly to the APU 30. In one embodiment, the APU generator 250 is a permanent magnet generator. Rotation of the rotor of the APU generator 250 generates electricity that can be provided to other parts of the aircraft 10. For example, the electricity can be used to start the turbines 20 or to power loads in the aircraft when the turbines are off (e.g., when on the ground). The APU generator 250 can be controlled by a generator controller 252.

For context and to display further embodiments, FIG. 3 shows an APU generator 250' that includes both a permanent magnet generator 302 and a main generator 304. The main generator 304 can be a wound field synchronous machine. In this instance, the rotation of the permanent magnet generator 302 generates electricity that can be condition and then provided to the main generator 304. The main generator 304 can then generate electricity that can be used to start the turbines 20 or to power loads in the aircraft when the turbines are off (e.g., when on the ground). Further, in both APU generator 250, 250' embodiments, power from turbines can be back-fed into the APU generator 250, 250' to start the APU 30.

For completeness, in FIG. 3, the APU generator 250' includes permanent magnet generator (PMG) 280 which rotates and generates a three-phase output power 290. The three-phase output power is passed through an electromagnetic braking circuit as described below and to a rectifier circuit 284 within the controller 252. The rectifier circuit 284 outputs DC power to an exciter drive 286. The exciter 236 outputs AC power that can be used (and possibly conditioned by) main generator 280 to cause a rotor to spin and, thereby generate AC electrical power that can be provided to a load.

With reference again to FIG. 2, in some cases, when the APU 30 is offline and the air cycle machine 202 remains online (e.g., during flight), it is possible for air exhausted from the air cycle machine 202 to backflow into the APU 30 instead of, or in addition to, out of the exhaust 204. When exhaust air backflows into the APU 30, the APU 30 windmills.

Similarly, when the aircraft 10 is on the ground, and the APU 30 is not operating, wind entering the exhaust 204 can cause the APU 30 to windmill in the reverse direction of its normal rotation. Regardless of the cause, in the prior art, windmilling can make the rotor position of the APU 30 unknown and interfere with open loop controls of the APU 130 unless a position sensor is provided. The position sensors add complexity and weight to the overall system. To overcome this, the output (e.g., stator coils) of the APU generator 250 (or PMG 280 in generator 250') can be selectively shorted to provide a braking torque to the shafts 230, 232 to prevent windmilling. This braking torque can be applied until an indication that the APU 30 is started or until the APU 30 begins to rotate above a threshold speed.

Figure 4:
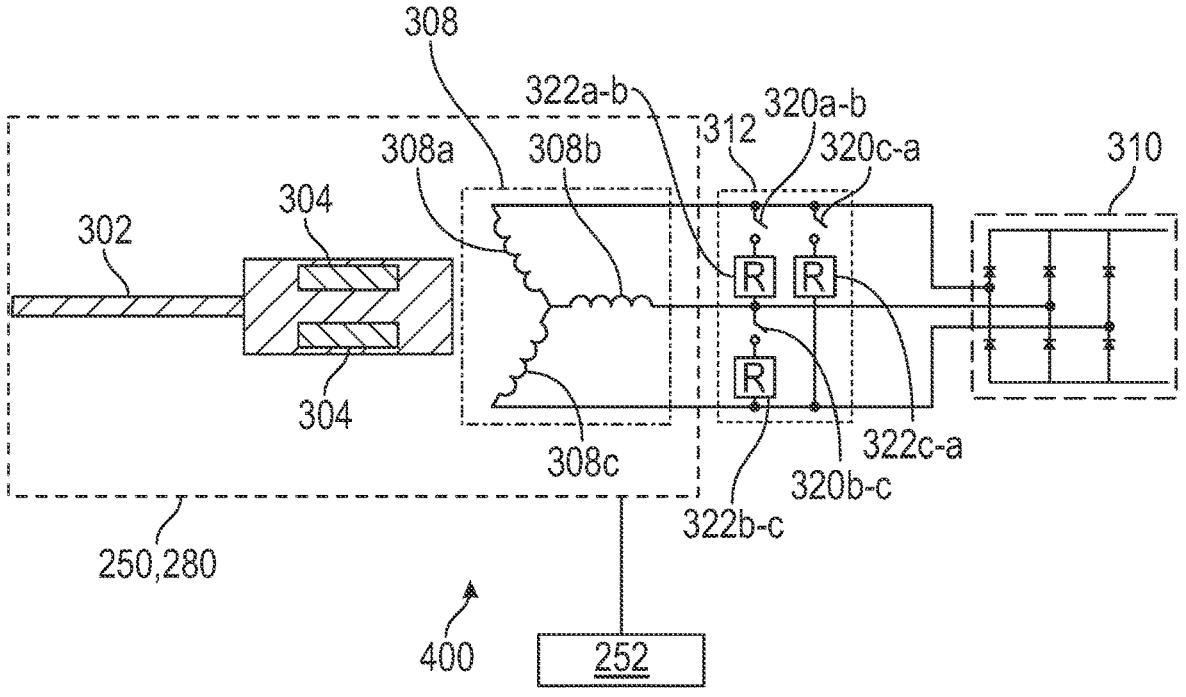
FIG. 4 is example APU generator that includes a wind-milling brake according to one embodiment.

FIG. 4 shows an assembly 400 that includes the APU generator 250 of FIG. 2 connected to an optional rectifier 310. It shall be understood, the teachings related to APU generator 250 can be applied to the PMG of FIG. 3. In normal operation, the generator 250 produces AC voltage that is converted to DC by the optional rectifier 310. That is, the rectifier serves as an AC to DC converter. The optional rectifier 310 can be rectifier 284 of FIG. 3 in one embodiment.

The assembly 300 also includes an anti-windmilling brake 312 that, when engaged, reduces or eliminates windmilling subject to the exceptions noted below. The anti-windmilling brake 312 can also be referred to as an electromagnetic brake herein.

In more detail, the generator 250 (or PMG 280) includes a rotor 302 that carries one or more magnets 304. The rotor 302 can be driven by the APU 30. For example, rotation of the shafts 230, 232 can cause the rotor 302 to rotate either directly or via a gear box or other linkage. The generator 250, 280 also includes a stator 308 that is illustrated as including stator phases (e.g., coils) 308a, 308b, 308c. In normal operation, the relative motion between the magnets 304 and the stator coils 308a, 308b, 308c will generate an AC voltage that can be rectified by the optional rectifier 310.

The anti-windmilling electromagnetic brake 312 is connected between the generator 250, 280 and the rectifier 310.

During operation, when the APU 30 is turned off the generator controller 252 engages the electromagnetic brake 312 which prevents rotation of the generator 250 by providing an opposing electromagnetic force. The electromagnetic brake 312 is connected to the output of the permanent magnet generator (PMG 232) across each of three (e.g., output phases) 308a, 308b, 308c. While the coils are represented schematically as inductors, however it is understood that the illustration represents any permanent magnet generator phase leg configuration and does not limit the construction of the generator.

Within the electromagnetic brake 312, each phase 308a, 308b, 308c is connected to each adjacent phase 308a, 308b, 308c via a respective switch 320a-b, 320b-c, 320c-a. Optionally, each switch can be connected to a respective resistive element 322a-b, 322b-c, 322c-a such that the switch 320a-b, 320b-c, 320c-a and respective resistive elements 322a-b, 322b-c, 322c-a are arranged between their corresponding phases.

To engage the electromagnetic brake 312, in one example, the controller 252 provides a signal to the switches 320a-b, 320b-c, 320c-a, closing the switches and creating a direct connection between the phases 308a, 308b, 308c. The direct connection between the phases 308a, 308b, 308c causes an armature reaction that resists rotation, and creates a braking torque opposing the torque generated due to windmilling. The particular resistance value of each resistor 322a-b, 322b-c, 322c-a is targeted to control the overall impedance of the system, and allows for the braking torque to be overcome when the windmilling, or other rotation of the generator 30 exceeds a threshold.

In some examples, the resistors 322a-b, 322b-c, 322c-a can be omitted entirely, creating a substantially larger braking torque that can prevent rotation entirely. These examples are referred to as having a direct connection between the phases.

In yet another example, the electromagnetic brake 312 can utilize self normally closed switches 320a-b, 320b-c, 320c-a and be self-powered. In such an example, when the APU 30 is deactivated, the PMG 20 stops providing power, and the normally closed switches 320a-b, 320b-c, 320c-a close activating the electromagnetic brake 312. When the APU 30 is reactivated, the generator 250 begins rotating and once the torque of the rotation overcomes the braking force, the generator 250 begins providing power which opens the normally closed switches removes the braking torque.

In the illustrated example of FIG. 3 the electromagnetic brake 312 is positioned immediately proximate the generator. In alternative constructions, the electromagnetic brake 312 can be disposed remote from the APU 30 within the controller 252 or as an entirely separate component. Further, depending on the physical location of the electromagnetic brake 312, the switches 320a-b, 320b-c, 320c-a within the electromagnetic brake 234 may be transistors or mechanical contactors, with the particular type of switch selected for a given system depending on the power requirements, weight limits, and expected environmental or ambient conditions of the switches 320a-b, 320b-c, 320c-a.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A power generation system for an aircraft comprising:
an auxiliary power unit (APU);
an APU generator mechanically linked to the APU;
a generator control unit coupled to the APU and configured to the control the APU generator; and
an electromagnetic windmilling brake connected to the APU generator, wherein the electromagnetic windmilling brake includes a number of switched phase connections equal to a number of phases and wherein the switched phase connections are configured to connect each output phase to an adjacent phase of the APU generator when the electromagnetic windmilling brake is engaged;
wherein each switched phase connection comprises a controllable switch and further comprises a resistor in series with the controlled switch.

2. The power generation system of claim 1, wherein a braking torque of the electromagnetic windmilling brake is dependent on the resistance of each resistor.

3. The power generation system of claim 1, wherein the generator control unit includes a memory storing instructions for causing the controller to respond to the APU transitioning from an on state to an off state by engaging the electromagnetic windmilling brake.

4. The power generation system of claim 1, wherein the electromagnetic windmilling brake is self-powered.

5. The power generation system of claim 4, wherein each switch in the electromagnetic windmilling brake is a normally closed switch and wherein power generated by rotation of the APU opens the normally closed switch.

6. The power generation system of claim 1, wherein the electromagnetic windmilling brake is a component of the APU generator.

7. The power generation system of claim 1, wherein the electromagnetic windmilling brake is disposed remote from the APU generator.

8. The power generation system of claim 1, wherein the electromagnetic windmilling brake is disposed electrically between an output of the APU generator and a rectifier.

9. The power generation system of claim 1, wherein the APU generator includes a permanent magnet generator (PMG) that includes a PMG rotor.

10. The power generation system of claim 9, wherein the APU generator does not include a PMG rotor position sensor.

11. A power generation system for an aircraft comprising:
an auxiliary power unit (APU);
an APU generator mechanically linked to the APU;
a generator control unit coupled to the APU and configured to the control the APU generator; and
an electromagnetic windmilling brake connected to the APU generator, wherein the electromagnetic windmilling brake includes a number of switched phase connections equal to a number of phases and wherein the switched phase connections are configured to connect each output phase to an adjacent phase of the APU generator when the electromagnetic windmilling brake is engaged;
wherein the APU generator includes a permanent magnet generator (PMG) that includes a PMG rotor;
wherein the generator control unit is configured to apply a braking torque with the electromagnetic windmilling brake until the PMG rotor spins faster than a threshold.

12. A method for preventing windmilling in an auxiliary power unit (APU) that is operatively connected to an APU generator, the method comprising:
responding to transitioning the APU from off to on by connecting each output phase of APU generator to an adjacent phase of the APU generator using a switched connection;

wherein connecting the output phases of the APU generator comprises actively closing a plurality of switches thereby creating an electrical pathway between the output phases, wherein connecting the output phases of the APU generator comprises actively closing a plurality of switches thereby creating an electrical pathway between the output phases;

wherein each electrical pathway includes a resistor in series with a corresponding switch in the plurality of switches.

13. The method of claim 12, wherein connecting each output phase of the APU generator to each other output phase of the APU generator comprises removing power from a plurality of normally closed switches thereby creating an electrical pathway from each output phase to each other output phase,
wherein a braking torque of the electromagnetic windmilling brake is dependent on the resistance of each resistor.

14. The method of claim 12, wherein the electromagnetic windmilling brake is self-powered.

15. The method of claim 14, wherein each switch in the electromagnetic windmilling brake is a normally closed switch and wherein power generated by rotation of the APU opens the normally closed switch.

16. The method of claim 12, wherein the electromagnetic windmilling brake is a component of the APU generator.

17. The method of claim 12, wherein the electromagnetic windmilling brake is disposed remote from the APU generator.

18. The method of claim 12, wherein the electromagnetic windmilling brake is disposed electrically between an output of the APU generator and a rectifier.

19. The method of claim 12, wherein the APU generator includes a permanent magnet generator (PMG) that includes a PMG rotor.

20. The method of claim 12, wherein the APU generator does not include a PMG rotor position sensor.

* * * * *